April 8, 1958     E. H. MUELLER     2,829,538

SAFETY ADAPTER FOR OPERATING HANDLES OF VALVES

Filed Feb. 6, 1953

INVENTOR.
ERVIN H. MUELLER
BY
Barnes Kisselle Laughlin & Raisch
ATTORNEYS.

United States Patent Office 2,829,538
Patented Apr. 8, 1958

2,829,538

SAFETY ADAPTER FOR OPERATING HANDLES OF VALVES

Ervin H. Mueller, Grosse Pointe, Mich.

Application February 6, 1953, Serial No. 335,508

2 Claims. (Cl. 74—548)

This invention relates to an adapter to be interposed between a stem or shaft of a valve and a knob or handle which is to be engaged or gripped by the fingers or hands of a person and manipulated to operate the shaft or stem.

It has been heretofore proposed a provide a handle or knob for the stem of a valve which knob or handle is normally rotatable relative to the stem, so that should the knob or handle be accidently turned on its axis, or purposely turned without an intention to open the valve, the knob or handle rotates relative to the stem without turning the valve stem. Thus the handle or knob has a certain safety factor.

The object of the present invention is to provide an adapter structure having one element arranged to be non-rotatably secured to or mounted upon a shaft or stem and the second element assembled with the first element in a manner so that the two are normally rotatable relative to each other. The second element is arranged to receive any suitable handle designed and constructed as desired. Thus a manufacturer of, for example, gas ranges, may design or select a handle having any desired esthetic or operating features or appeal, and by the use of the adapter may apply such handle or knob to his product. The elements of the adapter are arranged to interlock with each other so that they are non-rotatable relative to each other, for operating the stem through the means of the applied handle or knob, but the structure, mechanical design and ornamental design of the handle or knob, is not limited or confined as it is required to perform no "safety" function since these functions are all performed by the adapter.

The invention is disclosed in the accompanying drawings wherein.

Figure 1:
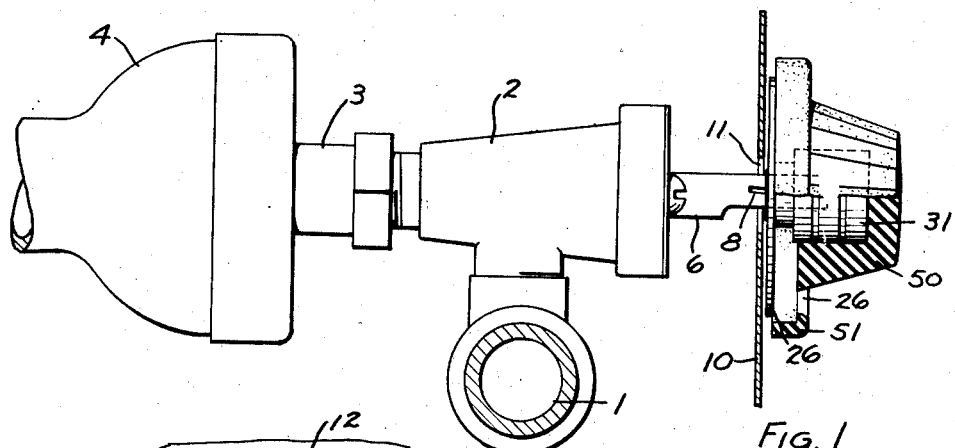
Fig. 1 is a general view illustrating a valve, a part of a burner mixing tube, a part of the stove structure, a handle and adapter with some parts shown in section.

In Fig. 1 a pipe or manifold for gas is illustrated at 1, and connected thereto is a valve 2 provided with a hood 3 through which gas is projected into a mixing tube 4 of a gas burner. The valve has an operating stem 6 which is to be turned to open and close the valve and, of course, the valve has an inner rockable valve member with suitable ports for this purpose. This member is not shown. The stem may have a flat side 7 for receiving the adapter and it may be slotted as at 8 to lend some degree of elasticity thereto.

The valve and its associated parts thus described may be mounted on a stove or range structure and the stove or range may have a panel 10 with an opening 11 through which the stem projects as indicated in Fig. 1. The panel 10 may be provided with a suitable index or indicating mark as illustrated at 12 which, of course, may be of any type.

Figure 3:
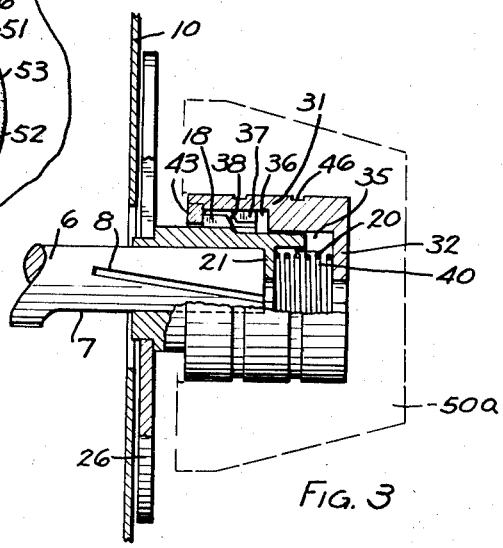
Fig. 3 is a sectional view taken through the adapter showing the same mounted upon a valve stem and illustrating the knob or handle in broken lines.
Figure 5:
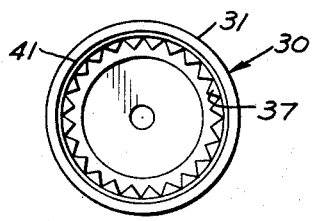
Fig. 5 is an end view of one element of the adapter.
Figure 6:
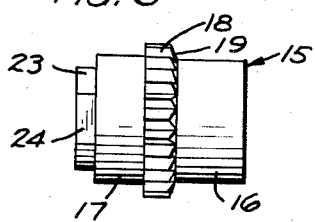
Fig. 6 is an elevational view of another element of the adapter.

The adapter is comprised of an inner member 15 having a hub portion 16, a hub portion 17, and an intermediate portion constituted by serrations or splines 18. Preferably the serrated or splined formation is such that the individual elements thereof are relatively small with quite a large number of them existing in a circumferential array and, indeed, preferably in such number that the formation is more in the nature of serrations. The teeth are preferably chamfered on one side as shown at 19. The member 15 is of hollow form with its hollow being of D-shape in cross section so that it may be frictionally applied over the stem, as shown in Fig. 3. The outer end of the element 15 is provided with a recess 20 defined by an intermediate internal wall 21. The opposite or inner end has an extension 23 to which a suitable indicator is attached. For this purpose the extension 23 may have a flat side 24 for receiving a similarly shaped opening in an indicator 26 shown herein as in the form of a disc. Thus, the inner member and the disc are non-rotatable relative to each other and both elements are non-rotatable relative to the stem 6.

An outer element of the adapter is generally illustrated at 30. It is of hollow form with a peripheral wall 31 and a bottom wall 32. The member 30 has a hollow portion in its bottom part, as shown at 35, which constitutes a bearing portion which has a rotatable fit with the hub 16. It has a cavity 36 of larger internal diameter which is provided with an internal splined or serrated structure 37 for cooperation with the serrated formation 18. The teeth are chamfered at 38 and thus the chamfered formation 19 and 38 normally face each other.

A relatively light coil spring 40 is positioned in the recess 20 so that it is disposed between the wall 21 and the bottom wall 32 and normally holds the outer element 30 urged to the right as Fig. 3 is viewed, with the teeth 18 and the teeth 37 out of engagement with each other. For holding the parts in assembly, the outer member 30 may have a circumferential groove or seat 41 at its forward edge for receiving a ring 43 secured in the seat. This ring may be press fitted in position so that it is held to the outer member 30 with sufficient strength to resist displacement because of the action of the spring 40. Normally, therefore, the spring urges the member 30 to the right and the ring 43 abuts against the teeth 18.

The indicator 26 may have a marking thereon as shown at 45. This marking may be of any suitable form, such as a spot as shown at 45, or other indicia such as the word "off."

Figure 2:
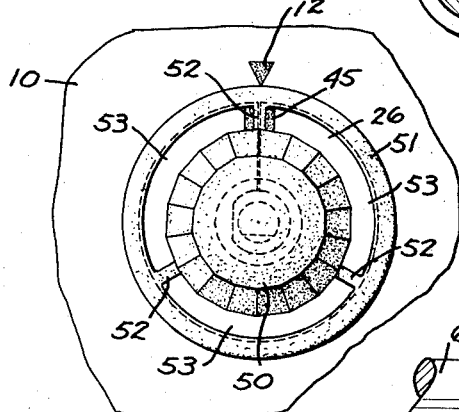
Fig. 2 is a front elevational view showing the handle.

A handle or knob, hereinafter for brevity called "handle," for use with the adapter, is illustrated as having a body portion 50 recessed for mounting over the member 30 for which purpose the member 30 may be formed with external grooves 46 to aid in frictional engagement. The handle may be cemented to or adhered to the member 30. The handle as shown has a peripheral rim portion 51 carried by spaced arms 52 thereby leaving elongated openings 53 between the body 50 and the rim 51. These openings are positioned so that the mark 45 is visible through the openings. Since the handle has no set position relative to the indicator 26, an arm 52 may at times lie over the mark 45, as indicated in Fig. 2, but the mark 45 is of sufficient size or width so that it nonetheless is visible. However, the handle may not necessarily have the rim portion but may be of smaller overall diameter so as to leave the outer portions of the indicator exposed as indicated by the handle 50a in Fig. 3. Since the indicator lies close to the panel 10 and may be relatively thin, as shown, it is not adapted to be manipulated to operate the valve.

The manufacturer of ranges may manufacture his product in the usual manner involving the stove structure along the lines as above described, and as is well known to many versed in this art, different models of ranges and different designs have varying ornamental appearances. It is desirable therefore, in many instances, to vary the shape of the operating handles or to vary the ornamental design thereof to harmonize with the stove or range. Such a manufacturer may employ the adapter of the present invention for mounting upon the stems of the valves and may apply a handle of any shape or design desired. It is only necessary to make the knob of hollow form for attachment to the adapter. From time to time a manufacturer produces different models and the handles may be modeled accordingly but the adapter structure may remain standard.

Figure 4:
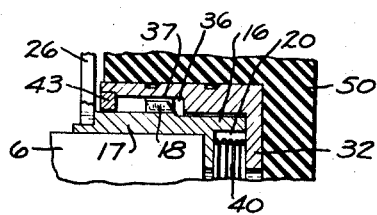
Fig. 4 is a sectional view showing the elements of the adapter positioned non-rotatably relative to each other.

In use, the adapter and the handle are normally in the position shown in Fig. 3. The handle may thus be turned purposely or accidentally without manipulating the valve. To operate the valve the user pushes axially on the handle thus causing the teeth 37 to move into dental engagement with the teeth 18. This is a short axial displacement against the light spring 40. The engaged position is shown in Fig. 4. The extending part of the wall 16 forms a stop and the axial movement is limited when the bottom 32 strikes the end of the hub 16. With the teeth thus in dental engagement the knob may be turned to operate the valve. Upon release the spring 40 pushes the outer member 30 of the adapter and handle back to the position shown in Fig. 3. Because the teeth 18 and the teeth 37, which match each other, are in large numbers and perhaps can be more properly termed serrations rather than splines, there is little likelihood of the teeth striking each other end to end as the handle is pushed inwardly so that no difficulty is encountered in establishing the dental engagement. More often than not, the handle is subjected to a slight turning as it is pushed inwardly, and this slight turning is adequate to cause the teeth to move into dental engagement.

I claim:

1. An adapter for securing a recessed operating handle to the operating stem of a valve so that the operating handle is normally freely rotatable relative to the stem, a subassembly comprising, a hollow inner member adapted to be secured over the end of the stem in driving relationship, said inner member having a bottom for engaging the end of the stem, the outer portion of the inner member being of rounded form and constituting a hub portion, a plurality of circumferentially arranged external teeth on the inner member disposed inwardly of the outer hub portion, an outer member of hollow form with a bottom portion, the outer member having a hollow part of relatively small diameter constituting a bearing portion and rotatably fitting upon the hub portion of the inner member, the outer member having an inner part of relatively large internal diameter for freely fitting over the external teeth of the inner member, a plurality of internal teeth on said inner portion of the outer member, a spring positioned between the bottom of the inner member and the bottom of the outer member normally urging the members axially with the teeth of the two members disaligned axially, the open end of the outer member projecting inwardly beyond the external teeth of the inner member, means secured to the outer member at its inner end and projecting inwardly in overlapping relationship with the external teeth on the inner member to hold the members assembled against the action of said spring, the inner member projecting inwardly of the stem and beyond the inner end of the outer member, an indicator secured to said projecting end of the inner member and extending radially outwardly beyond the outer member to a visible position, said outer member being adapted to fit within the recess of an operating handle, and being shiftable axially against the action of the spring to cause inter-engagement of said teeth on the inner and outer members whereby the stem of the valve may be turned when the teeth are so engaged by forces applied to the operating handle, said hub portion of said inner member having an end engageable against the bottom portion of said outer member to form a stop limiting movement of said members against the action of said spring when said teeth are inter-engaged.

2. An adapter for securing an operating handle to the operating stem of a valve comprising, a hollow inner member adapted to be secured over the end of the stem in driving relationship, said inner member having a bottom defining its hollow cavity and having a hub portion, a plurality of circumferentially arranged teeth on the inner member at an intermediate part thereof, an outer member of hollow form and with a bottom portion, said outer member having a hollow part of relatively small diameter for rotatably fitting upon the hub portion, and having a part of relatively large internal diameter for freely fitting over the teeth on the inner member, a plurality of internal teeth in the portion of the outer member having the larger diameter, a spring positioned between the bottom of the inner member and the bottom of the outer member normally urging the members axially with the teeth of the two members disaligned axially, the outer surface of the outer member adapted to receive an operating handle, and means secured to the open end of the outer member for rotatably engaging said teeth on the inner member, said means and said teeth on said inner member cooperating to limit relative axial movement of said members in one direction for holding the members in assembly, said outer member being shiftable axially in the other direction against the action of the spring to cause engagement of the teeth on the two members whereby the stem may be turned by forces applied to the operating handle, said hub portion of said inner member having an end engageable against said bottom of said outer member to form a stop for limiting relative axial movement of said members in said other direction when said teeth are engaged.

References Cited in the file of this patent

UNITED STATES PATENTS

| | | |
|---|---|---|
| 1,020,223 | Sabatino | Mar. 12, 1912 |
| 1,537,227 | De Witt | May 12, 1925 |
| 2,068,693 | Newell | Jan. 26, 1937 |
| 2,390,792 | Jespersen | Dec. 11, 1945 |
| 2,427,310 | Shumaker | Sept. 9, 1947 |
| 2,454,122 | Barger | Nov. 16, 1948 |
| 2,527,458 | Schurr | Oct. 24, 1950 |
| 2,602,351 | Ringler et al. | July 8, 1952 |
| 2,603,325 | Pickard | July 15, 1952 |